(No Model.)
E. N. RIOTTE.
PROCESS OF OBTAINING PRECIOUS METALS FROM ORES BY AMALGAMATION.
No. 289,781. Patented Dec. 4, 1883.
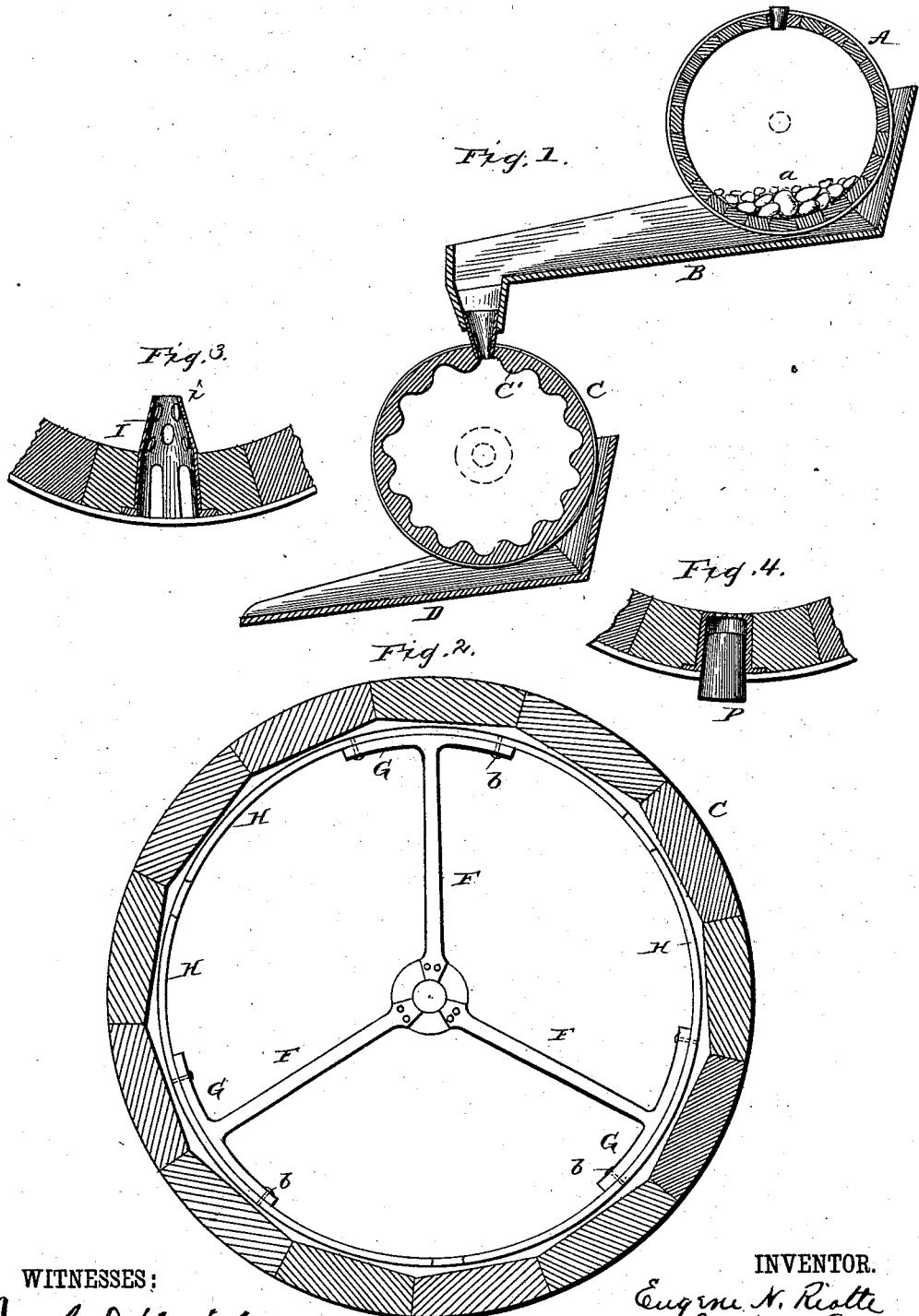
WITNESSES:
INVENTOR.

UNITED STATES PATENT OFFICE.

EUGENE N. RIOTTE, OF NEW YORK, N. Y.

PROCESS OF OBTAINING PRECIOUS METALS FROM ORES BY AMALGAMATION.

SPECIFICATION forming part of Letters Patent No. 289,781, dated December 4, 1883.

Application filed July 13, 1882. (No model.)

*To all whom it may concern:*

Be it known that I, EUGENE N. RIOTTE, a citizen of the United States of America, residing at New York, in the county of New York and State of New York, have invented certain new and useful Improvements in Processes of Obtaining Precious Metals from Ores by Amalgamation, of which the following is a specification, reference being had therein to the accompanying drawings.

The object of my invention is the extraction of the precious metals from raw or roasted ores; and it consists in first submitting the crushed or pulverized ore to the action of salt, manganese, and sulphuric acid in the presence of mercury in a closed vessel, then discharging the pulp into a second vessel containing iron or iron scraps, which changes the chlorides of silver, copper, and mercury formed in the first barrel back to metals, the copper and silver remaining in the mercury as amalgam.

Figure 1 in the accompanying drawings is a vertical section of the two barrels and discharging-trough. Fig. 2 is a vertical section of the barrel containing the iron, and is a modification of the lower barrel in Fig. 1. Figs. 3 and 4 are sections of the lower barrel, showing the straining-bung.

Similar letters of reference refer to similar parts in the several figures.

Heretofore in the treatment of gold and silver ores the ore has been first chloridized and then leached, or chloridized and amalgamated; but not in the particular manner herein specified.

My process is particularly applicable to ores which are too poor to roast, and extracts more perfectly the precious metals from ores that have been or must be roasted with or without salt than any of the old methods; and, furthermore, ores that have been roasted will by my process yield from five to ten per cent. more in gold and silver, and will produce these metals of any required degree of fineness, while in the operation the mercury will be left perfectly clean—*i. e.*, free from base metals.

The operation is as follows: The ore, roasted or unroasted, as above described, is crushed to a suitable size, and is then charged direct into a Frieberg barrel, A, in which cobble-stones *a* are placed to facilitate the thorough mixing of the ore and chemicals. Sufficient water is added to make a thick mortar. In the case of unroasted ores enough salt, manganese, and sulphuric acid is added to generate sufficient chlorine to chloridize all the gold, silver, and copper in the ore. In case of ores roasted with salt, only enough of the above materials are added to furnish chlorine for the silver that has remained unchloridized by the roasting, and as there is always a surplus of salt in roasted ore, only binoxide of manganese and sulphuric acid are necessary to generate chlorine in this case. From this point the process for roasted and unroasted ores does not differ. The barrel A now receives its usual quantity of mercury, and is allowed to revolve from ten to twelve hours, the chlorine generated attacks the mercury and forms calomel and corrosive sublimate, which act upon the silver, copper, and other base metals in the ore, changing them to chlorides. After this reaction has taken place, the ore is discharged into a precipitating barrel or vessel, C, lined on the inside with corrugated iron, as shown in Fig. 1, or having the rigid arms F G, to which are secured bars or pieces of iron H, or scraps of iron may be placed in the barrel. This barrel C is allowed to revolve from eight to ten hours. The iron changes all the chlorides of silver, copper, and mercury that were formed in the first barrel back to metals and chlorides of iron, but does not reduce the chloride of lead nor any of the other base metals, thus leaving the amalgam perfectly free of the base metals in a condition called "clean" or "quick," so that this same mercury can be easily gathered and immediately reused in the first barrel. The second barrel, C, is then filled with water, allowed to revolve at half-speed from two to four hours, and the contents discharged into common iron settlers, which gather the mercury and amalgam, consisting of the silver and copper contained in the ore, and a surplus of mercury now added. This amalgam is strained and retorted in the usual manner.

In order to prevent scraps of iron from escaping from the second barrel. I have provided the funnel-shaped bung I, having openings z, which will allow the free escape of the mercury, but will retain the iron scraps in the barrel.

As heretofore indicated, I am aware that it is old in the art of amalgamation to first chloridize the precious metals by the use of chloride of lime and an acid, and finally amalgamate the chloridized metal; but in these old processes I find that the operation of chloridizing the metal is not successful, owing to the unreliable and bulky character of commercial chloride of lime or bleaching-powder, while in the case of using gaseous chlorine the operation is exceedingly objectionable to workmen, and not as active and effective as in my process, where the nascent chlorine acts within the barrel or pan directly upon the metals, while the entire chemical reactions are continuous from the chlorination to the formation of the amalgam.

Having thus described my invention, what I claim as new, and desire to secure by Letters Patent, is—

In separating precious metals from ores, the herein-described process, which consists in mixing the ore with salt, manganese, sulphuric acid, and mercury, agitating the mass until the metals are changed to chlorides, then subjecting the pulp to the action of metallic iron for the purpose of reducing the chlorides, and finally gathering the formed amalgam, substantially as set forth.

In testimony whereof I affix my signature in presence of two witnesses.

EUGENE N. RIOTTE.

Witnesses:
W. C. DUVALL,
J. H. MACDONALD.